(12) United States Patent
Lauvdal

(10) Patent No.: US 8,647,043 B2
(45) Date of Patent: Feb. 11, 2014

(54) HAND TRUCK

(76) Inventor: Olav Lauvdal, Marnardal (NO)

(*) Notice: Subject to any disclaimer, the term of this patent is extended or adjusted under 35 U.S.C. 154(b) by 0 days.

(21) Appl. No.: 13/264,907

(22) PCT Filed: Apr. 16, 2010

(86) PCT No.: PCT/NO2010/000142
§ 371 (c)(1),
(2), (4) Date: Oct. 17, 2011

(87) PCT Pub. No.: WO2010/120190
PCT Pub. Date: Oct. 21, 2010

(65) Prior Publication Data
US 2012/0045304 A1    Feb. 23, 2012

(30) Foreign Application Priority Data

Apr. 17, 2009  (NO) .................................... 20091543
Feb. 11, 2010  (NO) .................................... 20100212

(51) Int. Cl.
*B62B 1/14* (2006.01)
(52) U.S. Cl.
USPC ........................................ 414/445; 280/47.27
(58) Field of Classification Search
CPC ............. B62B 1/00; B62B 1/02; B62B 1/06; B62B 1/10; B62B 1/14; B62B 1/16
USPC ............. 280/42, 47.27; 294/65.5; 414/222.1, 414/331.08, 444, 445, 490, 492, 509, 513, 414/585, 606, 737, 793.2, 797.1
See application file for complete search history.

(56) References Cited

U.S. PATENT DOCUMENTS

| | | | |
|---|---|---|---|
| 2,682,348 A | | 6/1954 | Stumphauzer |
| 3,155,256 A | * | 11/1964 | Cook ............................ 414/445 |
| 3,712,496 A | | 1/1973 | Miller |
| 3,878,958 A | * | 4/1975 | Ring ............................. 414/490 |
| 4,244,595 A | * | 1/1981 | Sagert ......................... 280/47.29 |

(Continued)

FOREIGN PATENT DOCUMENTS

DE    3834311 A1    4/1990
EP    0 192 994 A1    9/1986

(Continued)

OTHER PUBLICATIONS

International Search Report issued in PCT/NO2010/000142, mailed on Aug. 13, 2010, 5 pages.

(Continued)

*Primary Examiner* — Saul Rodriguez
*Assistant Examiner* — Brendan Tighe
(74) *Attorney, Agent, or Firm* — Osha Liang LLP

(57) ABSTRACT

A hand truck has a frame, at least one wheel which is mounted to the frame at a lower part of the frame, at least one holding magnet for holding an object which, at least in part, has a magnetic or magnetizable outer surface, and a release mechanism mounted to the frame. The release mechanism has a release member movably mounted to the frame of the hand truck. The at least one holding magnet is attached to the release member. The release member is mounted to the frame of the hand truck such that the at least one holding magnet can be pulled backwards while the object rests against the frame, thereby providing a damage free release of the object.

19 Claims, 18 Drawing Sheets

(56) References Cited

U.S. PATENT DOCUMENTS

| | | | | |
|---|---|---|---|---|
| 5,340,136 A * | 8/1994 | MacNeil et al. | | 280/47.2 |
| 5,624,224 A * | 4/1997 | Brandenburg | | 414/490 |
| 5,971,693 A * | 10/1999 | Story et al. | | 414/490 |
| 5,993,134 A * | 11/1999 | Williamson | | 414/490 |
| 6,666,466 B1 * | 12/2003 | Rainho | | 280/47.27 |
| 6,719,521 B1 * | 4/2004 | Van Boxtel | | 414/490 |
| 7,530,579 B2 * | 5/2009 | Butler | | 280/47.28 |
| 2002/0187030 A1 | 12/2002 | Boyanich | | |
| 2003/0189303 A1 * | 10/2003 | Ciminelli | | 280/47.34 |

FOREIGN PATENT DOCUMENTS

| | | | |
|---|---|---|---|
| GR | 1006166 | B2 | 11/2008 |
| NO | 324317 | B1 | 9/2007 |
| WO | 85/01218 | A1 | 3/1985 |
| WO | 97/13718 | A1 | 4/1997 |
| WO | 2010/120190 | A1 | 10/2010 |

OTHER PUBLICATIONS

Written Opinion issued in PCT/N02010/000142, mailed Aug. 13, 2010, 5 pages.

Response to Written Opinion issued in PCT/NO2010/000142, including claim amendments, 7 pages.

International Preliminary Report on Patentability issued in PCT/NO2010/000142, mailed on May 25, 2011, including amended claims, 8 pages.

Norwegian Search Report issued in Norwegian parent application 20100212, dated Jul. 6, 2010, 2 pages.

Office Action issued in Norwegian parent application 20091543, dated Oct. 14, 2009, 2 pages.

Extended European Search Report Issued in European Application No. 107647810.9, Dated May 9, 2012 (4 pages).

* cited by examiner

HAND TRUCK

BACKGROUND OF THE INVENTION

1. Technical Field

The present invention relates to hand truck for manual transport of objects which is formed with an outer surface of a material that is magnetisable or magnetic, i.e. a material to which a magnet will stick. Typical examples of such objects are white and brown goods, i.e. washing machines, stoves, refrigerators etc.

2. Related Art

When white or brown goods are transported over relatively short distances a hand truck, like a sack barrow, is often used. Hand trucks are used to transport this type of objects in shops or in ware houses when moving the objects, in private homes when the white goods are delivered on the door by the company selling the white goods and in places where white goods are returned and collected for recycling. These hand trucks are, however, often not designed for bulky and often heavy objects like white and brown goods. As can be seen in FIG. 1, an operator using a hand truck to transport white goods will often have to assume an awkward position where one is used to hold the object being transported and the operator is left with only one hand to push and steer the hand truck. This is not only uncomfortable, but may also cause damage to the object if that person looses control of the hand truck, which would be very unfortunate if the object to be transported is new. The person using the hand truck may also suffer injuries if he or she looses control of the hand truck or is using the hand truck regularly to transport objects like white and brown goods over an extended period of time, as for example in a work situation.

A strap may be used to secure the object to the hand truck, but since the objects to be transported by the hand truck usually come in different sizes, a number of straps of slightly different lengths would have to be available. It is also a time consuming operation, therefore straps are not used if the objects are transported over short distances. A flexible strap would not be suitable as the object would not be safely secured to the hand truck.

In U.S. Pat. No. 5,340,136 there is disclosed specialized hand truck for transport of gas cylinders including magnets to hold the gas cylinders. The hand cart further comprises a foot operated release mechanism which includes a pivotable cam. When the cam is rotated it will move along the surface of the gas cylinders scratch the surface of the cylinders. For gas cylinders, which normally find use in industrial environments, this is not a problem. For new items of white goods and similar objects, this is unacceptable. Customers who by any item of white goods, expect the surfaces to be without scratches, dents or any other visible damage.

SUMMARY

One or more embodiments of the present invention provides a hand truck for safe transport of objects with a magnetic or magnetisable surface, and with a release mechanism which does not damage the surface of the object when the object is released.

There is provided a hand truck for manual transport of an object which, at least in part, is formed with a magnetic or magnetisable outer surface. The hand truck comprises a frame, at least one wheel which is mounted to the frame at a lower part of the frame, and at least one holding magnet for holding the object. The hand truck further comprises a release mechanism which is mounted to the frame where the release mechanism comprises a release member which is movably mounted to the frame of the hand truck. In order to release the object from the at least one holding magnet, i.e. physically separating the object and the at least one magnet until the distance between the at least one holding magnet and the object is so large that the magnetic force between the object and the at least one holding magnet is insufficient for the object to be held by the at least one holding magnet, several alternative solutions may be employed.

The at least one holding magnet may be attached to the release member and the release member mounted to the frame of the hand truck such that the at least one holding magnet can be pulled backwards while the object rests against the frame. The release member may be pivotably mounted to the frame of the hand truck. Alternatively the release member may be mounted to the frame of the hand truck such that it follows a linear path when being pulled backwards.

Alternatively the at least one magnet may be attached to the frame of the hand truck while the release member is movably mounted to the frame of the hand truck in a linear direction towards and away from the object, thereby separating the object from the at least one holding magnet.

Or alternatively the at least one magnet may be attached to the frame of the hand truck while the release member is pivotably mounted to the frame of the hand truck such that when a first end of the release member is pulled backwards by an operator a second, opposite end of the release member is pivoted towards the object, thereby pushing the object from the at least one holding magnet. The second end of the release member comprises means for substantially friction free contact between the second end of the release member and the surface of the object. Usually the first part and second part of the release member will be the upper part and the lower part respectively.

Thereby a damage free release of the object is obtained.

The term "magnetic outer surface" or just "magnetic" is herein used denote a material of the type that a magnet will attach itself to. Fridges, stoves, washing machines and other types of white and brown goods are typical examples of objects which are usually provided with an outer surface in material which a magnet will stick to, but other objects with similar sizes and outer surfaces which attract magnets are equally suitable for transport with the hand truck.

Normally the hand truck is provided with two wheels arranged on a common shaft, and may also be provided with additional stair climbing wheels if the hand truck are to be used to move objects up and down stairs which may be the case for example when a company delivers white and/or brown goods to a costumer living in a private home.

The at least one magnet is attached to the frame or to the release mechanism such that when the hand truck is placed next to an object with an outer surface that is magnetic, the object, like for example an item of white goods, will be attached to the magnet.

The release mechanism is provided in order to release the object from the magnetic holding force of the holding magnet. According to one or more embodiments of the present invention, the holding magnet is a permanent magnet. The release mechanism can be designed such that the object is pushed away from the hand truck and the at least one holding magnet (if the object is heavy, it may be the hand truck which is pushed away from the object), or it may be designed such that the at least one magnet is pulled away from the object while the object rests against the frame of the hand truck. In order to avoid damage to the surface of the object being transported, the frame may be provided with a plate that the object rests against.

In an embodiment of the invention the release mechanism comprises a release member which is configured such that the release member is movable relative to the frame of the hand truck. The release member may be configured such that the release member is rotatable relative to the frame of the hand truck.

As mentioned, the release mechanism with the release member may be configured such that the release member can undergo a substantially linear movement relative to the frame of the hand truck. Such a release mechanism may comprise a release member arranged in a guide member mounted to the frame of the hand truck. The release member can be provided with a release plate which comes in contact with the object during release of the object, and can be moved forward and backward relative to the frame of the hand truck and thereby releasing the object. If the at least one holding magnet is secured to the release member in stead of the release plate, the release member must be configured such that the release member and the at least one holding magnet can be moved backward away from the object and thereby releasing the object from the holding magnet. If the at least one holding magnet is secured to the frame of the hand truck, then the release member with the release plate should be configured such that the bolt can be moved forward and thereby pushing the object away from the frame of the hand truck and consequently the at least one holding magnet. To reduce the chance of damaging the surface of the object during release, the release plate may be provided with a soft material like rubber or similar.

In an embodiment of the invention the release member is rotatably mounted to the frame of the hand truck for example by employing bolts or similar. Hinge means may also be used to provide a rotatable connection of the release member to the frame of the hand truck. It must be emphasized that the release member may take many different shapes.

In an embodiment of the invention the release member is rotatably mounted to the frame of the hand truck about an axis of rotation where the axis of rotation passes through a lowermost part of the release member and the at least one holding magnet is secured to the release member. In this embodiment the release member is pulled backward in a similar way to what a door would be and the at least one holding magnet is pulled back together with the releasing member. When the release member and the at least one holding magnet is pulled back, the object rests against the frame of the hand truck preventing the object from moving backwards together with the release member and the at least one holding magnet. Thus, the object is released from the holding force of the at least one holding magnet.

In an embodiment of the invention the release member is rotatably mounted to the frame of the hand truck about an axis of rotation where the axis of rotation passes through a midportion of the release member, and, according to one or more embodiments of the present invention, a lower mid-portion of the release member. On rotation of the release member, a lower portion of the release member will then project forward and push on an object which is held by the at least one holding magnet. In this embodiment the at least one holding magnet is normally mounted on the frame of the hand truck, but may also be mounted on the release member. When the lower portion of the release member moves forward, the object is pushed forward (or the hand truck is moved backwards if the object is heavy), thereby releasing the object from holding force from the at least one holding magnet.

The lowermost part of the release member is provided with means for substantially friction free contact between the release member and the object during release of the object. Damages free handling of the object during release of the object is thereby be obtained. This is due to the fact that when the lower portion of the release member moves forward and comes into contact with the object, the outer surface of the object may get scratched and/or dented. The means for reducing friction may comprise at least one wheel, at least one sleeve or a similar device which is rotatably mounted to the lowermost part of the release member such that the at least one wheel or sleeve rotates on the outer surface of the object when the object is released. The at least one wheel or sleeve may further be provided with a relatively soft material like rubber or plastic to further reduce the chance of damaging the outer surface of the object during release.

Alternatively, the friction reducing means may be in the form of a low friction material which is provided on the part or parts of the release member which are in contact with the object during a releasing operation. This protective material may for example be a plastic material like Teflon®. Teflon is a registered trademark of E.I. du Pont de Nemours and Company.

In an embodiment of the invention the hand truck is provided with at least one stop element which limits the movement of the release member. Such a stop member may simply be a small pin or similar attached to the frame of the hand truck. Alternatively the movement limiter may be a spring, a string, a wire or a similar device which is arranged such that the movement of the release member is limited.

The hand truck may also be provided with a load carrying plate attached to the lower part of the frame such that it projects forward and can carry some of the weight of the object.

Other features and advantages of the invention will appear from the description of embodiments of the invention below, with reference to the figures where:

DETAILED DESCRIPTION

Embodiments of the present invention will be described with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
FIG. 1 illustrates a user who transports white goods using an ordinary hand truck.

FIG. 1 shows a user transporting a white goods apparatus with a hand truck widely available on the market today. As can easily be seen, the working position is not good with respect to injuries or to the safe transport of the white goods.

FIG. 2-5 discloses different possible embodiments of the rotatable release member 20 with the axis of rotation A of the release member relative to the frame 12 of the hand truck indicated for each embodiment. As should be evident, only a part of the frame 12 of the hand truck is shown in these figures.

Figure 2:
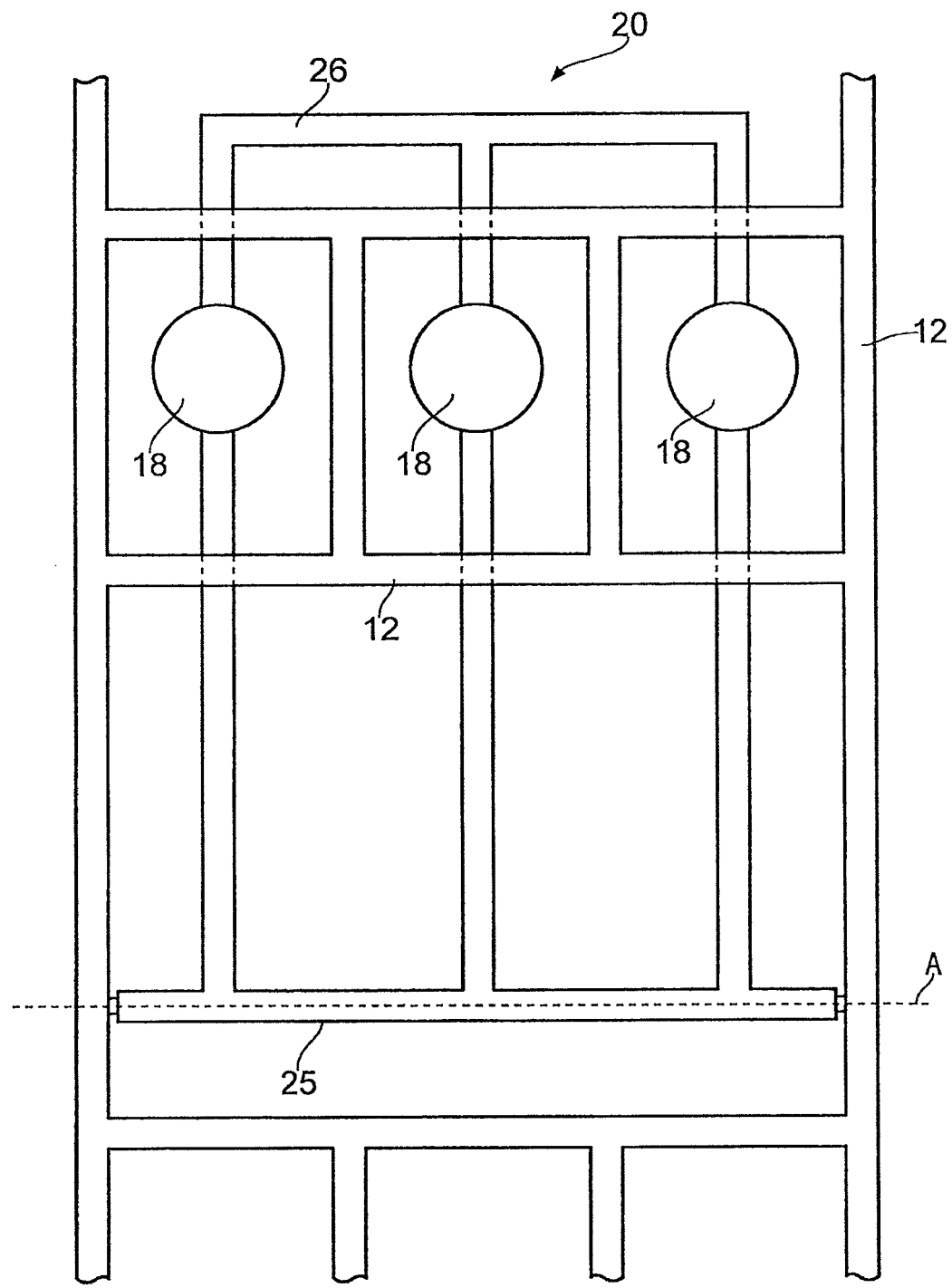
FIG. 2 illustrates diagrammatically a release mechanism according to a first embodiment of the present invention.

In FIG. 2 there is disclosed an embodiment with a release member 20 provided with three holding magnets 18. Obviously, the number of holding magnets 18 may be varied according to need. The release member 20 is rotatably mounted about an axis A to the frame 12 of a hand truck. The axis A is substantially horizontal when the hand truck is placed on a horizontal floor or on horizontal ground, and passes through a lowermost part 25 of the release member 20. When releasing the object, the release member 20 is pulled backwards at the uppermost part 26 of the release member 20 whereby the holding magnets 18 are also pulled backwards away from the object being transported. When the release member 20, together with the holding magnets 18, are pulled backwards, the object will rest against the frame 12 of the hand truck and the object is thus released from the magnetic holding force of the holding magnets 18.

Figure 3:
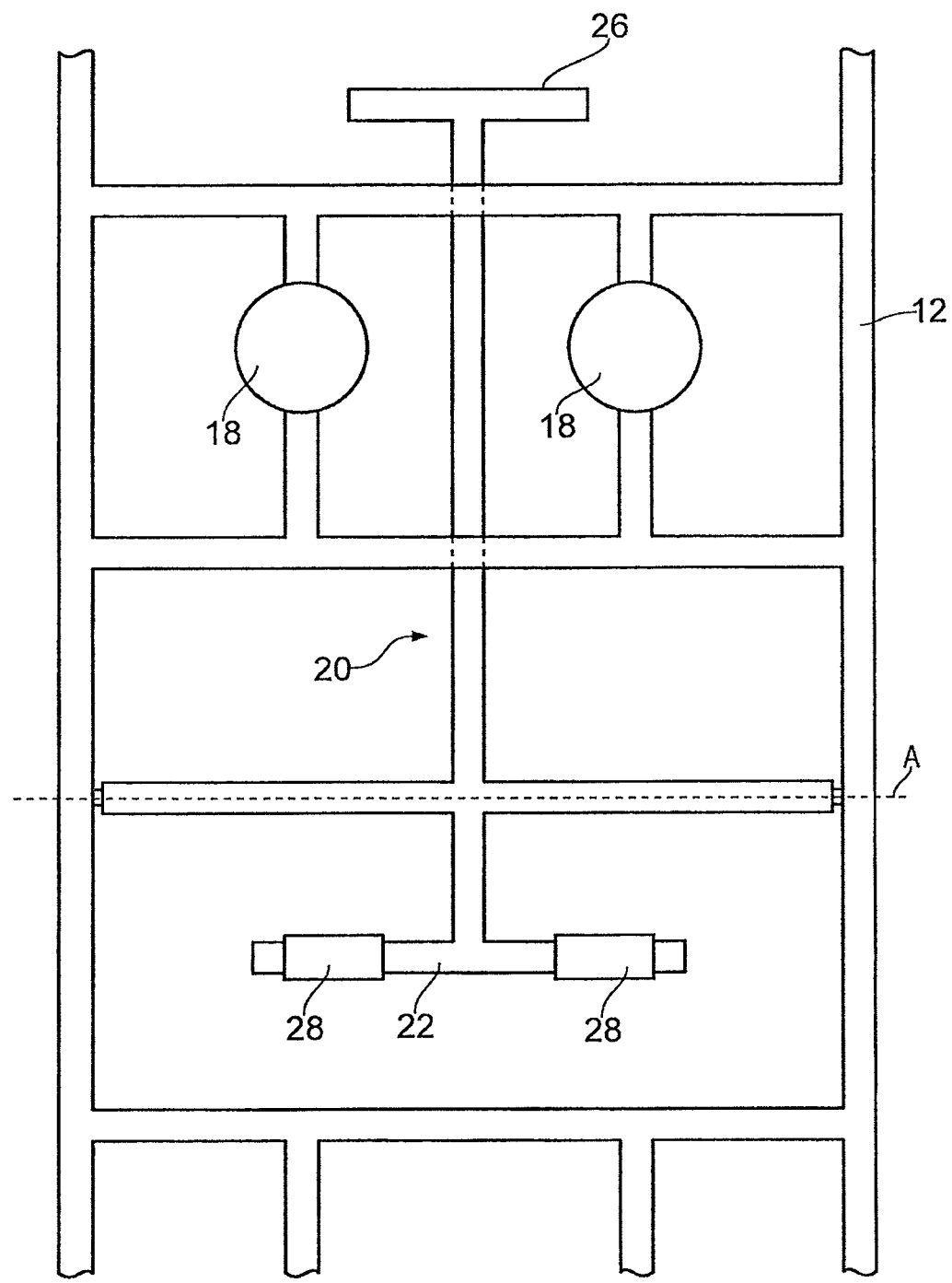
FIG. 3 illustrates diagrammatically a release mechanism according to a second embodiment of the present invention.

In FIG. 3 there is disclosed a release member 20 having a slightly different construction, but this embodiment of the release member 20 works in exactly the same way as the embodiment shown in FIG. 2. Two holding magnets 18 are mounted to the frame 12 of the hand truck and the release member 20 is rotatably mounted about axis A to the frame 12 of the hand truck. Again, the number holding magnets 18 may obviously be one or more than two if so desired. The uppermost part 26 of the release member 20 is formed to give a good hold when releasing the object. When the release member 20 is rotated, the lower portion 22 projects forwards and pushes the object away from the holding magnets 18 and thereby releasing the object. As can be seen, the lowermost part of the release member 20 is provided with means for reducing friction against the outer surface of the object during release. The means shown in FIG. 3 is in the form of wheels or sleeves 28 which are rotatably mounted to the lower portion 22 of the release member 20. When the object is released, the sleeves 28 will roll over the outer surface of the object, thus avoiding scratching and/or denting the outer surface. According to one or more embodiments of the present invention, the sleeves 28 are also covered with a soft material in order to further reduce the chance of damaging the surface of the object when it is being released from the holding magnets 18.

Figure 4:
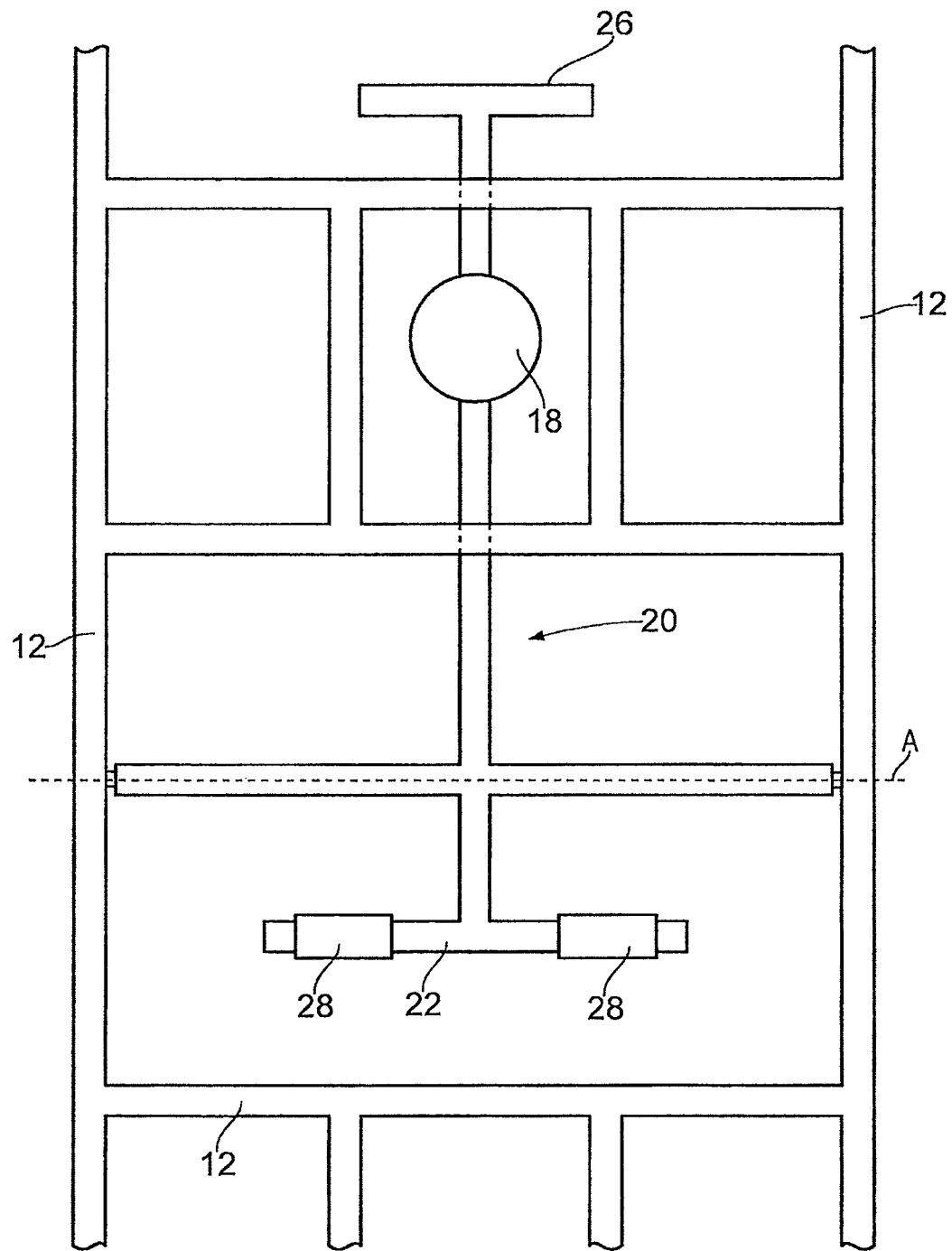
FIG. 4 illustrates diagrammatically a release mechanism according to a third embodiment of the present invention.

In FIG. 4 the release member 20 is similar to the release member 20 shown in FIG. 3. The embodiment shown in FIG. 3 is provided with one holding magnet 18 mounted at the upper portion of the release member 20. The release member is rotatably mounted about axis A to the frame 12 of the hand truck below the middle of the release member 20. When the release member 20 is rotated the lower portion 22 projects forwards and the holding magnet 18 is pulled backwards since it is mounted to the release member 20. As can be seen, the lowermost part of the release member 20 is also provided with means for reducing friction in the form of wheels or sleeves 28 which are rotatably mounted to the release member 20. Again, according to one or more embodiments of the present invention, the sleeves are provided with a soft material, like for example rubber, in order to further reduce the chance of damaging the surface of the object when it is being released from the holding magnets 18 and rolling over the surface of the object.

Figure 5:
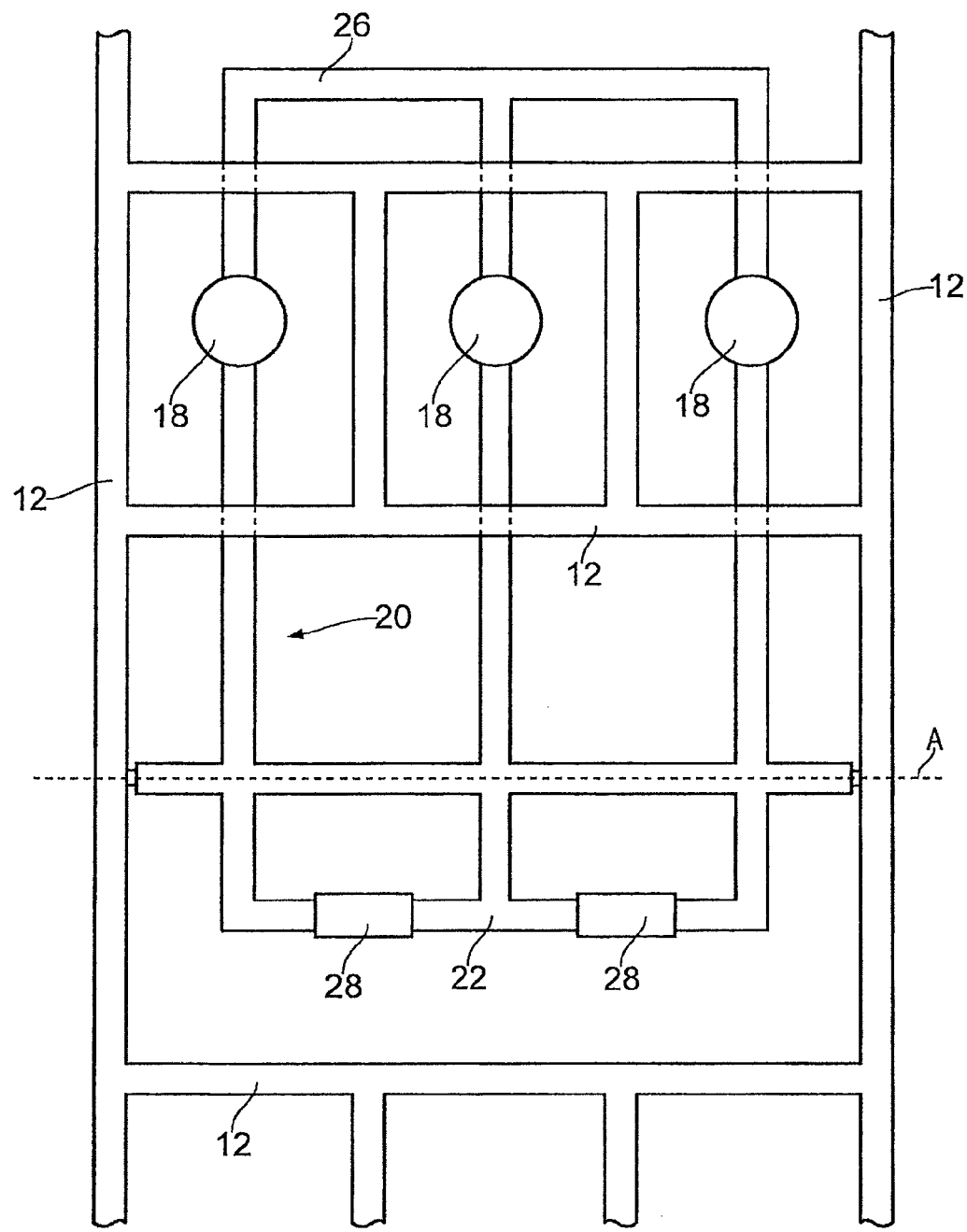
FIG. 5 illustrates diagrammatically a release mechanism according to a fourth embodiment of the present invention.

In FIG. 5 there is disclosed an embodiment which is a combination of the embodiment disclosed in FIG. 1 and the embodiment disclosed in FIG. 4. In this embodiment three magnets are mounted to the release member 20. When releasing the object the upper portion of the release member 20 is pulled backwards so that the release member rotates about axis A and at the same time the lower portion 22 of the release member 20 projects forwards and pushes on the object such that the object is released from the holding force of the holding magnets 18. The release member 20 is provided with sleeves 28 as described above in order to avoid damaging the surface of the object when it is released. According to one or more embodiments of the present invention, the sleeves 28 are provided with a soft material, like for example rubber, in order to further reduce the chance of damaging the surface of the object when it is being released from the holding magnets 18 and rolling over the surface of the object.

In FIGS. 2-5 a few possible way of designing the release member has been shown, but it is obvious that there are many other possible designs that will allow a damage free release of the object from the holding magnets 18. Furthermore, in stead of using wheels or rotatable sleeves 28, the lower part 22 of the release member 20 may be provided with material like Teflon in order to minimize friction between the lower part 22 of the release member 20 and the object during release of the object.

Figure 6:
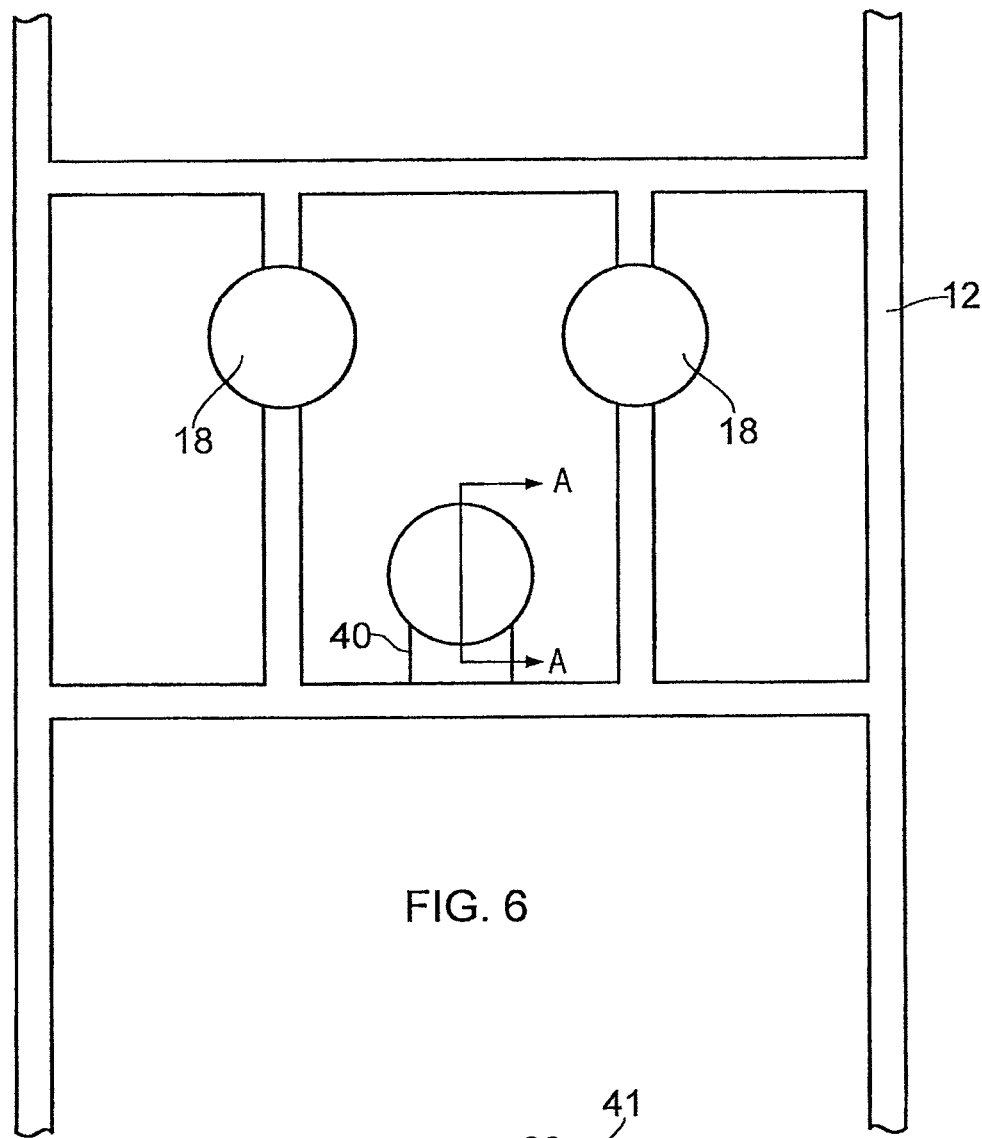
FIG. 6 illustrates diagrammatically a release mechanism providing the release member with a substantially linear movement according to a fifth embodiment of the present invention.
Figure 7:
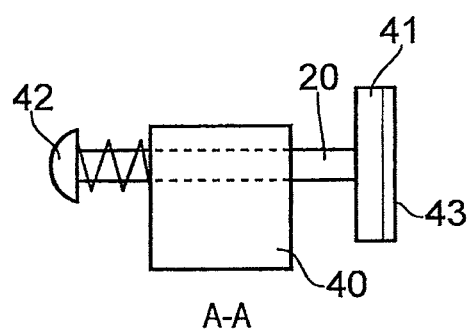
FIG. 7 shows section A-A in FIG. 6.

In FIGS. 6 and 7 there is disclosed an embodiment where the release mechanism is configured such that the release member 20 performs a linear movement. The release member holder 40 is secured to the frame 12 of the hand truck. In the release member holder 40 there is provided a through-going hole adapted to fit the release member 20 which can move back and forth in the through-going hole. At the end of the release member 20 facing the object there provided a contact plate 41 or alternatively a holding magnet (not shown). In the other end there is provided a knob 42 and, according to one or more embodiments of the present invention, a spring in order to urge the release member 20 and the contact plate 41 to move to its rest position. When the object is released the release member 20 is pushed forward against the object (or pulled backward if the holding magnet is provided on the bolt) and the object is thus released from the holding force of the holding magnets 18. According to one or more embodiments of the present invention, the contact plate 41 is provided with a soft material, like for example rubber, in order to reduce the chance of damaging the surface of the object when it is being released from the holding magnets 18.

Figure 8:
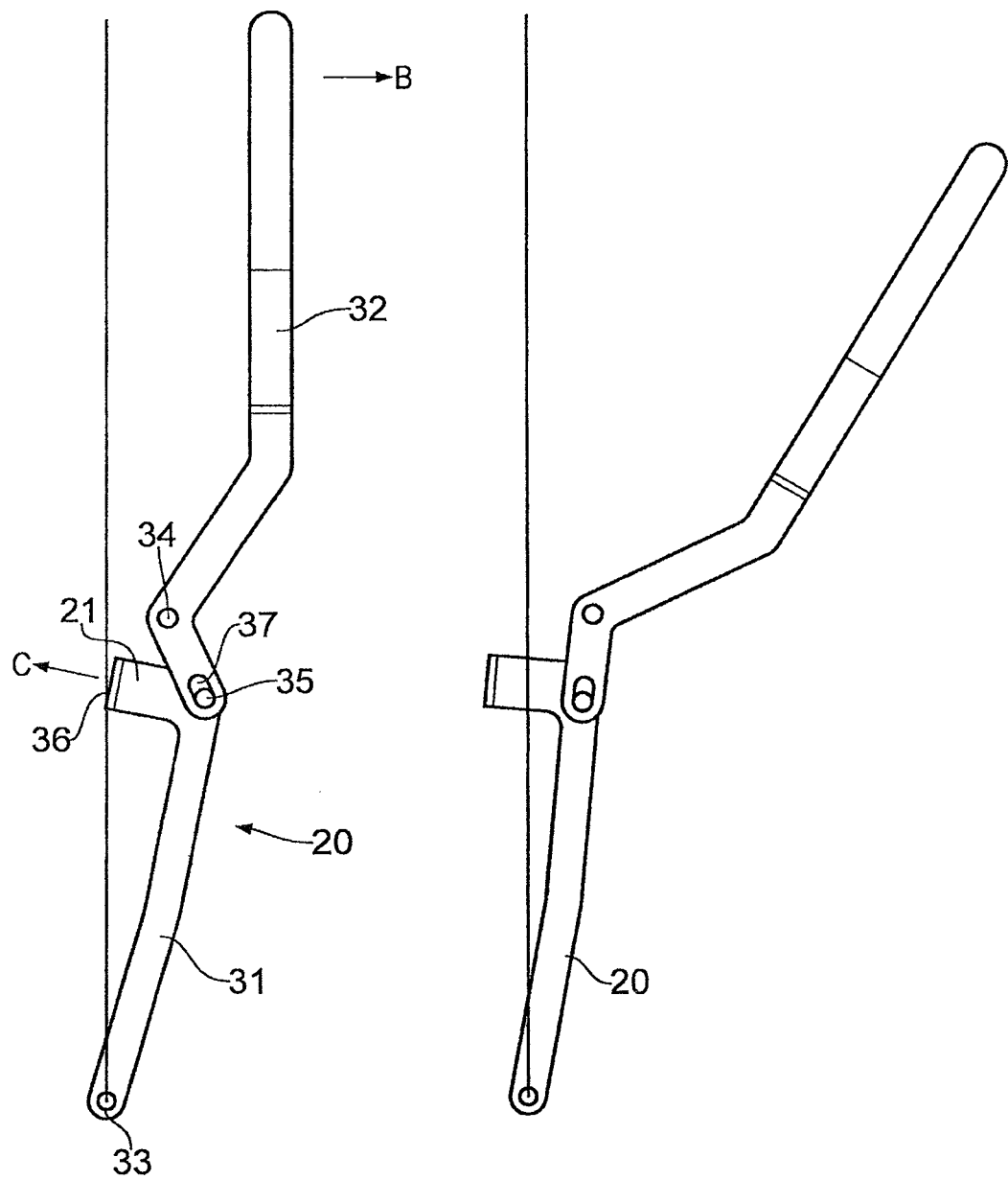
FIG. 8 illustrates a further release mechanism providing the release member with a substantially linear movement.

In FIG. 8 there shown an alternative embodiment in order to provide a substantially linear movement of a contact part 21 of the release member 20 which pushes the object when the object is being released. In this embodiment, the release member is formed with a long, substantially vertical leg 31 which is rotatably attached to the frame 12 of the hand truck with a rotatably connection 33, like for example a bolt. A handle 32 is rotatably connected to the frame 12 of the hand truck with a rotatable connection 34, which may comprise a bolt. The handle 32 is, at its lower end, below the connection 34, provided with a slots 37 in which bolts 35 are slidably arranged, according to one or more embodiments of the present invention, one slot and one bolt on each lateral side of the hand truck. The bolts are attached to the release member 20 such that when the handle 32 is pulled backwards in the direction shown by arrow B, the contact part 21 of the release member 20 projects forwards and pushes the object away from the holding magnets, which in this embodiment must be attached on the frame 12 of the hand truck. According to one or more embodiments of the present invention, the contact part 21 is provided with a soft material 21, like for example rubber, in order to reduce the chance of damaging the surface of the object when it is being released from the holding magnets 18.

Figure 9:
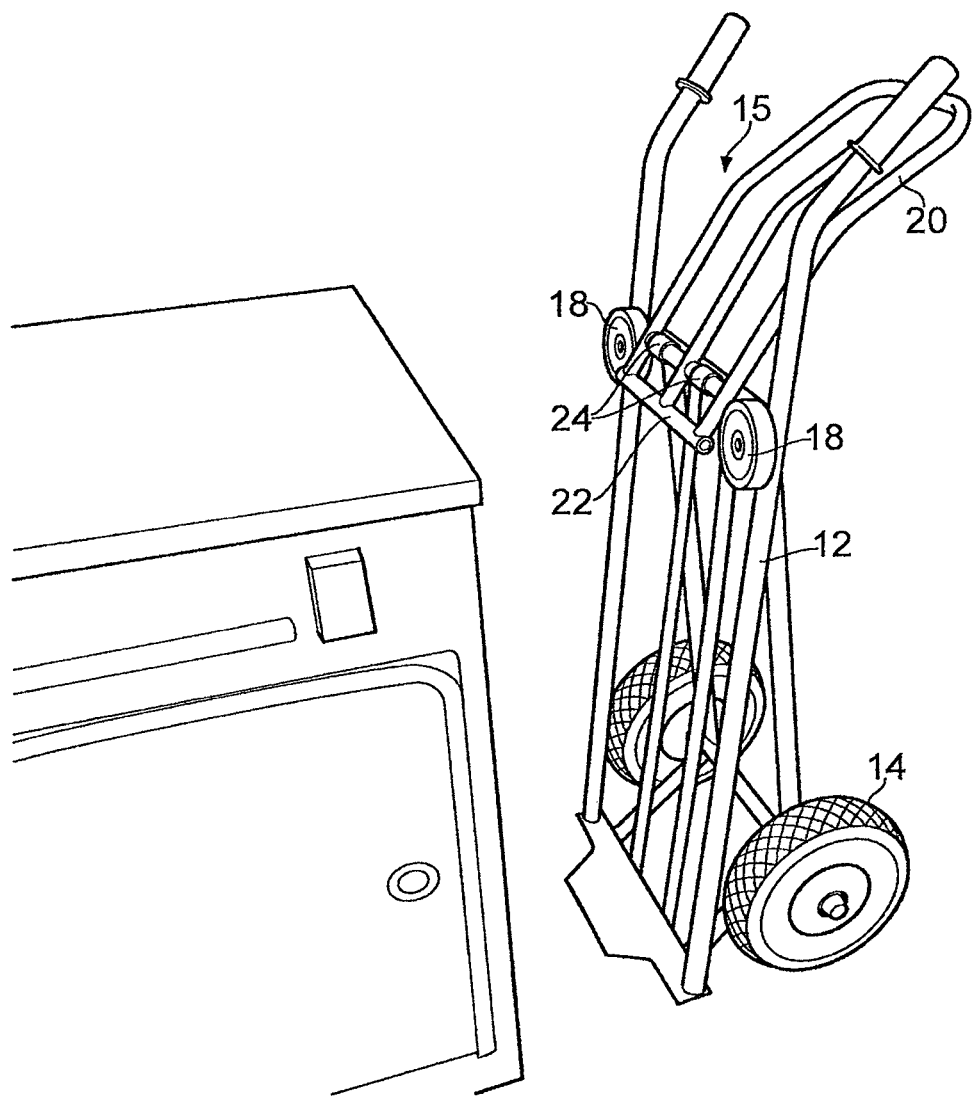
FIG. 9-11 shows a prototype of an embodiment of the present invention.
Figure 10:
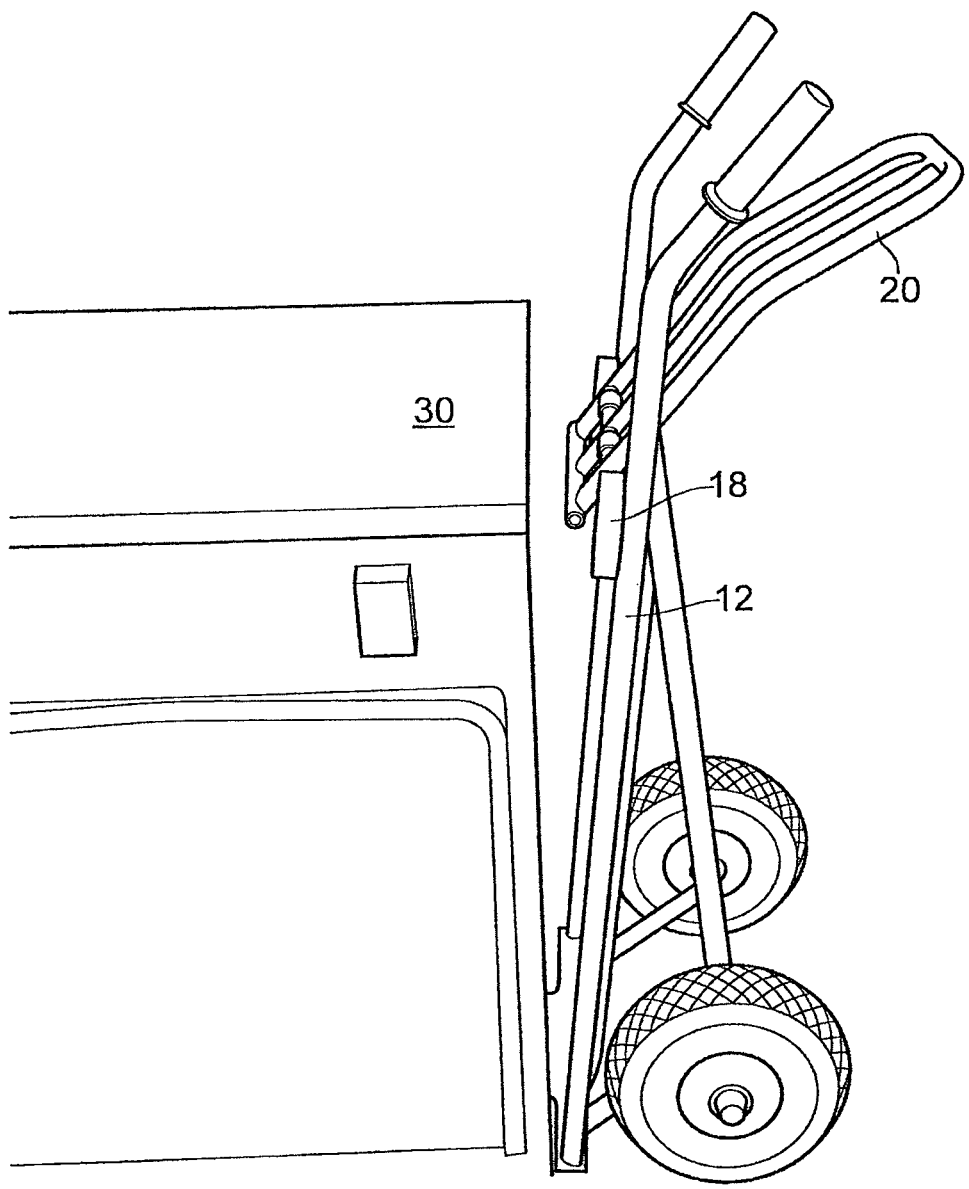
Figure 11:
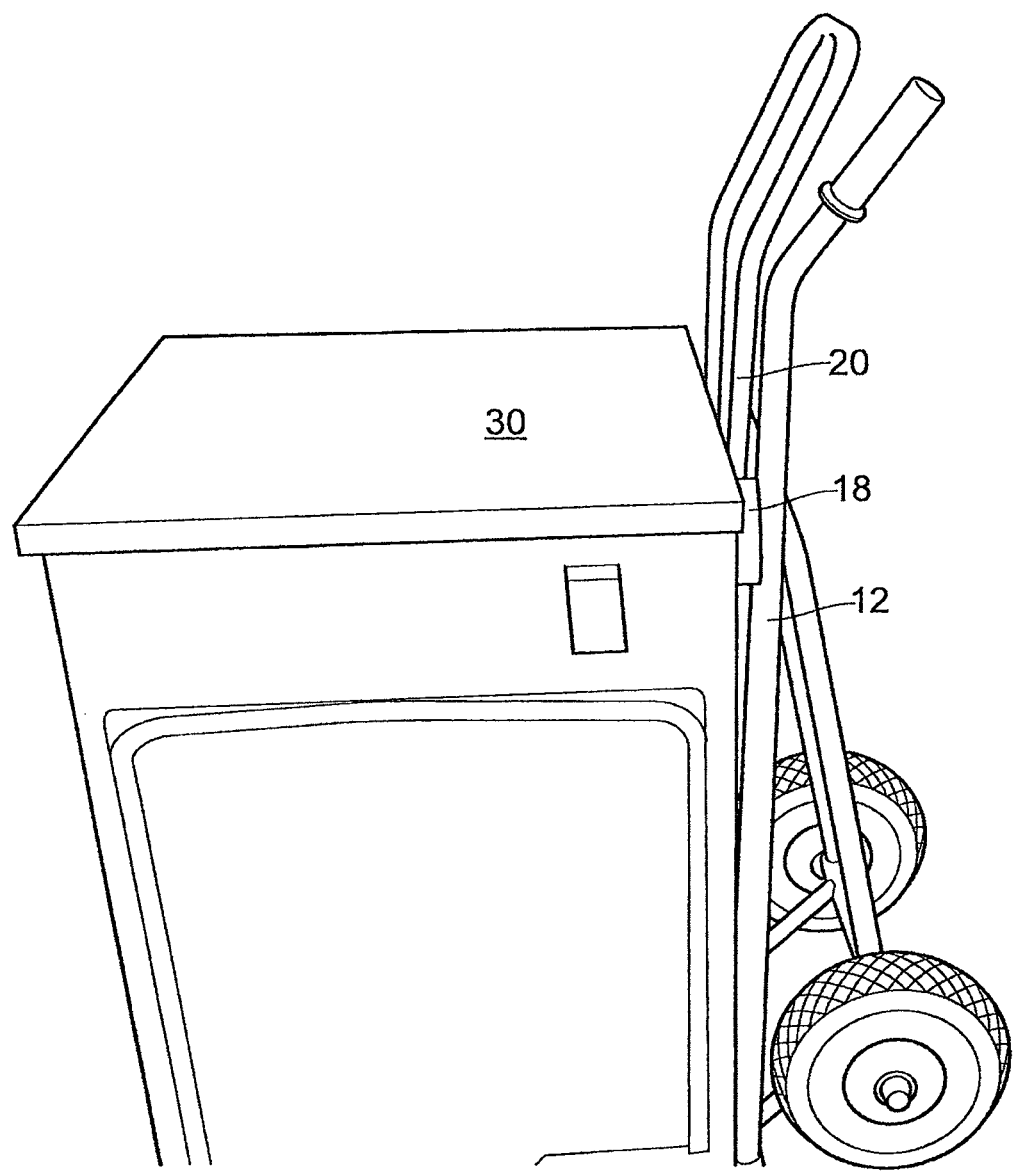
Figure 12:
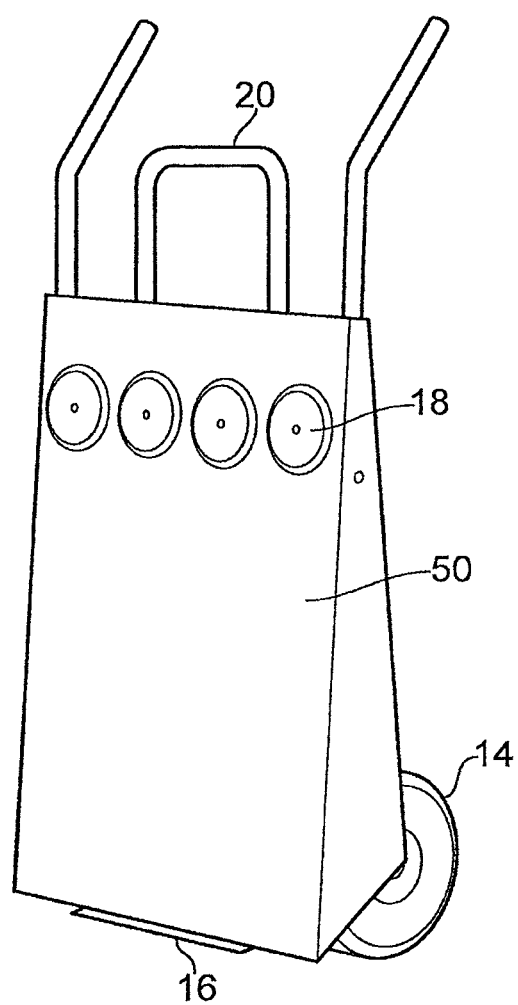
FIG. 12-18 show a further embodiment of the present invention.
Figure 13:
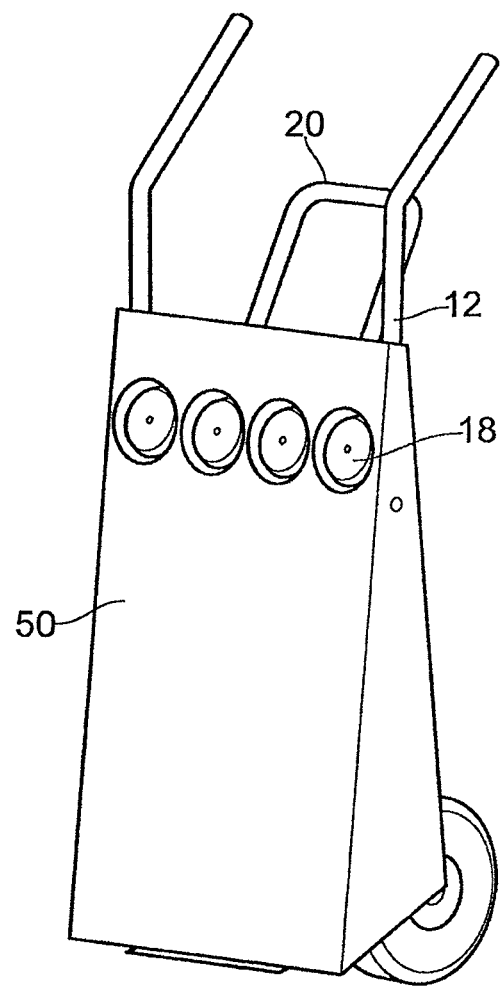
Figure 14:
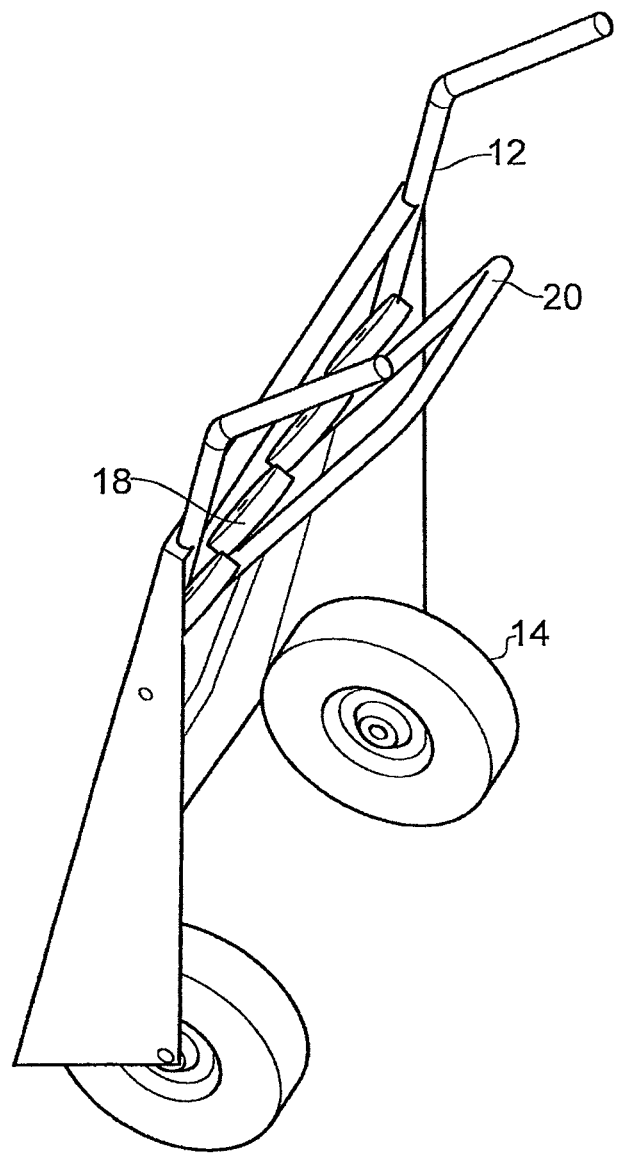
Figure 15:
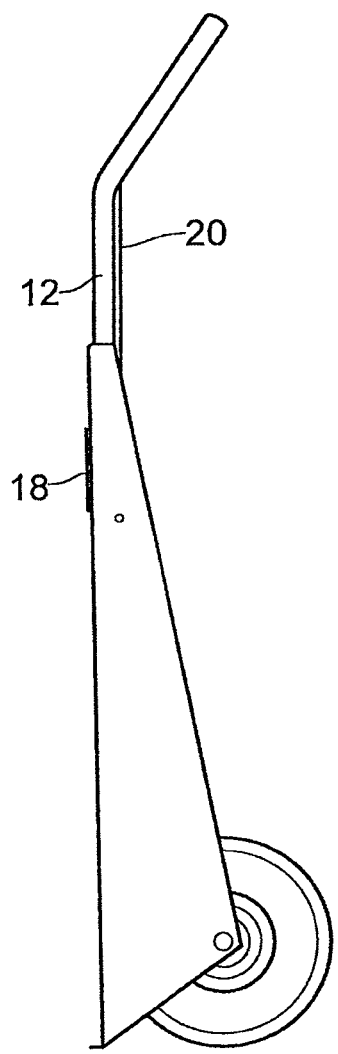
Figure 16:
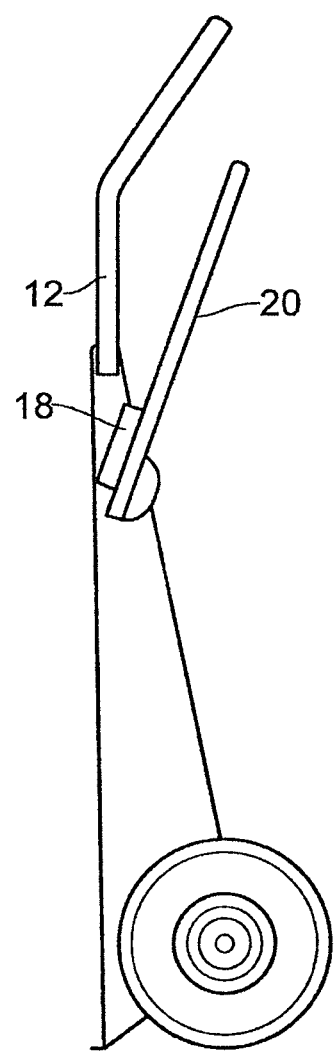
Figure 17:
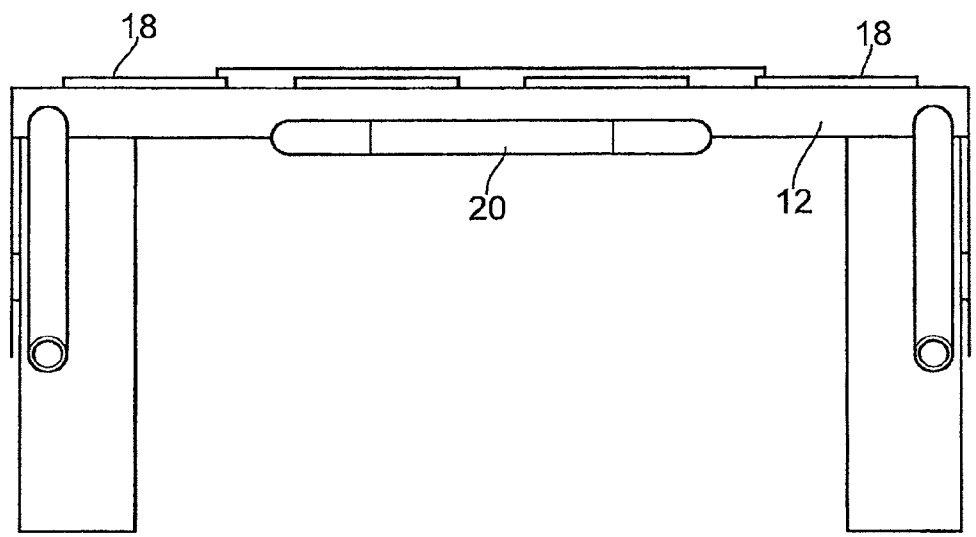
Figure 18:
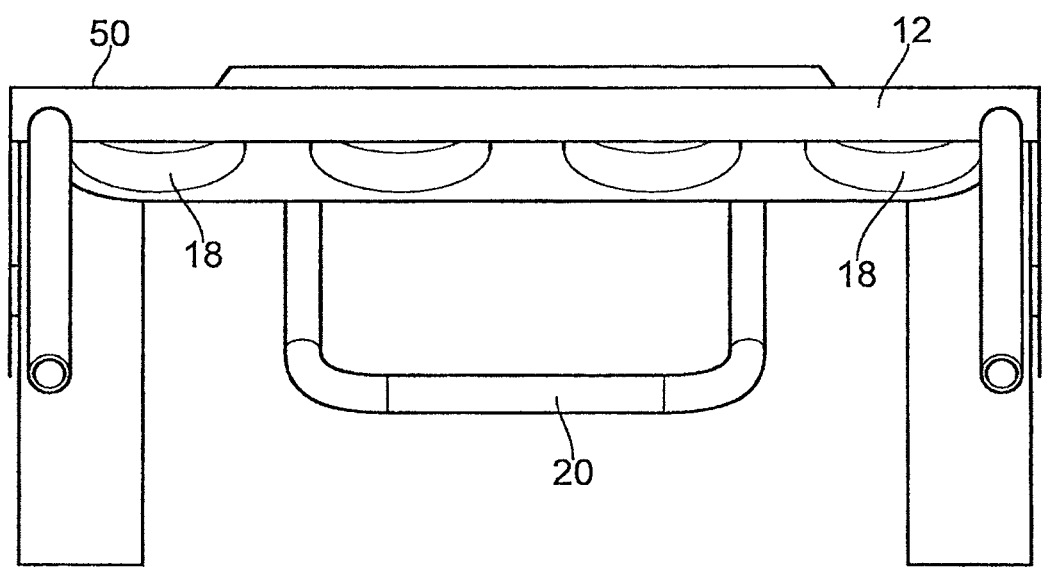

FIGS. 9-11 discloses a prototype of an embodiment of the hand truck 10 comprising a frame 12 with a load bearing plate 16 provided at a lower portion of the frame 12. Wheels 14 are mounted to the frame 12. To the upper portion of the frame 12 of the hand truck there are mounted two holding magnets 18 and a release mechanism 15. The release mechanism 15 comprises a release member 20 with a lower portion 22. The release member 20 is rotatably connected to the frame 12 of the hand truck 10 with sleeves 24 which are secured to the frame 12, for example by welding. There are also other ways to secure the release member 20 to the frame 12, for example bolts, screws or a hinge means. As should be obvious from the figure, the hand truck is moved close to the object 30 when it is to be transported and the holding magnets 18 will hold the object 30 during transport. When the object is to be released, the releasing frame 20 is rotated and the release member thereby pushing on the object 30 and releasing it.

In FIGS. 12-18 the same embodiment of the hand truck 10 is shown from different angles. In this embodiment there is provided four holding magnets 18 which are arranged on the release member 20 such that the are pulled backwards together with the release member 20 when the object 30 is being released from the holding magnets 18. From each view point the hand truck 10 is shown with the magnets 18 in a position where it is capable of holding the object 30, and in a retracted position where the object 30 will be released from the holding power of the holding magnets 18. As can be seen on the figures, the frame in this embodiment of the hand truck is provided with a plate 50 against which the object 30 can rest during transport, thereby reducing the chance of damaging the surface of the object 30 during transport.

Figure 19:
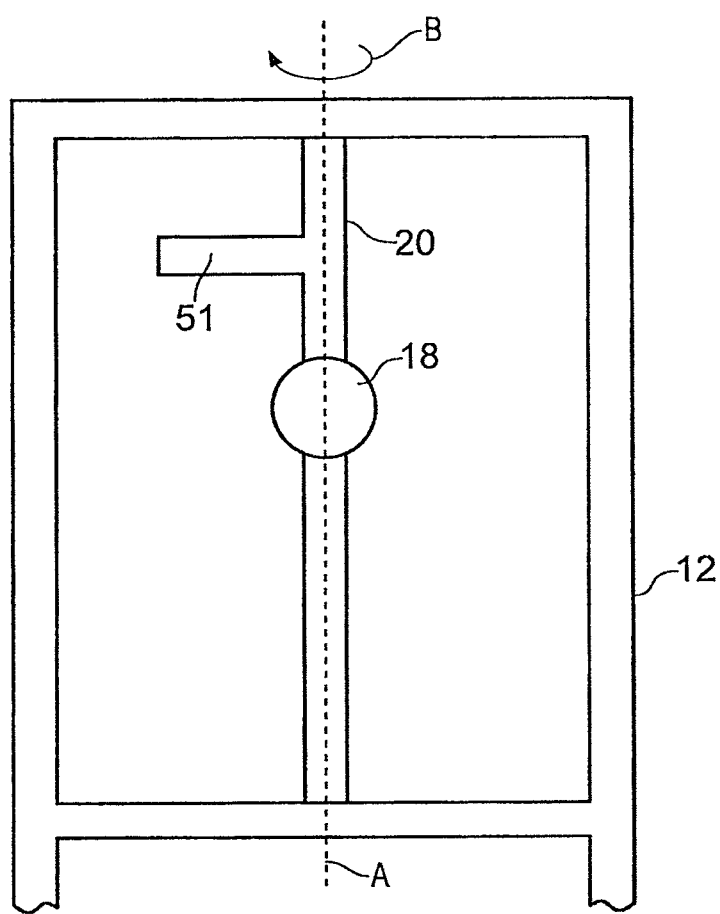
FIG. 19 illustrates diagrammatically a the release mechanism where the release member is rotatably mounted to the frame of the hand truck according to a sixth embodiment of the present invention.

In FIG. 19 there is shown a further embodiment of the present invention. The release member 20, is in this embodiment mounted rotatably about axis A to the frame 12 of the hand truck. The axis A is vertical in the embodiment shown and when the object is released, the handle 51 of the release member 20 is pulled backwards such that the release member 20 rotates about axis A, in the direction indicated by arrow B. The holding magnet 18 is thereby twisted and broken away from the object and hence the object is released from the holding force of the holding magnet 18. Even though the axis A in FIG. 19 is vertical, it would be obvious for a skilled person that the release member 20 may also be arranged such that it is rotatable about a horizontal axis, or possibly rotatable about an axis arranged at angle between the horizontal and vertical directions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A hand truck comprising:
a frame;
at least one wheel which is mounted to the frame at a lower part of the frame;
at least one holding magnet for holding an object which, at least in part, has a magnetic or magnetisable outer surface; and
a release mechanism mounted to the frame,
wherein the release mechanism comprises a release member movably mounted to the frame of the hand truck,
wherein the at least one holding magnet is attached to the release member, and
wherein the release member is mounted to the frame of the hand truck such that the at least one holding magnet can be pulled backwards from the frame while the object rests against the frame, thereby providing a damage free release of the object.

2. The hand truck according to claim 1, wherein the release member is movable in a linear direction towards and away from the object.

3. The hand truck according to claim 1, wherein the linear direction is substantially perpendicular to a plane formed by the frame of the hand truck facing the object when the object is held by the at least one holding magnet.

4. The hand truck according to claim 1, wherein the at least one holding magnet is attached to the release member, and wherein the release member is rotatably mounted to the frame of the hand truck.

5. The hand truck according to claim 1, wherein the frame of the hand truck is provided with a plate against which the object rests during transport.

6. The hand truck according to claim 1, wherein the hand truck is provided with at least one stop element which limits the movement of the release member.

7. The hand truck according to claim 1, wherein the hand truck is provided with a plate attached to the lower part of the frame such that it projects forward which will carry a part of the weight of the object.

8. Use of a hand truck according to claim 1 for transport of objects of white and brown goods type.

9. The hand truck according to claim 2, wherein the linear direction is substantially perpendicular to a plane formed by the frame of the hand truck facing the object when the object is held by the at least one holding magnet.

10. The hand truck according to claim 2, wherein the frame of the hand truck is provided with a plate against which the object rests during transport.

11. The hand truck according to claim 2, wherein the hand truck is provided with at least one stop element which limits the movement of the release member.

12. The hand truck according to claim 3, wherein the frame of the hand truck is provided with a plate against which the object rests during transport.

13. The hand truck according to claim 3, wherein the hand truck is provided with at least one stop element which limits the movement of the release member.

14. The hand truck according to claim 4, wherein the release member is rotatably mounted to the frame of the hand truck about an axis which passes through the lowermost part of the release member.

15. The hand truck according to claim 4, wherein the frame of the hand truck is provided with a plate against which the object rests during transport.

16. The hand truck according to claim 4, wherein the hand truck is provided with at least one stop element which limits the movement of the release member.

17. The hand truck according to claim 5, wherein the hand truck is provided with at least one stop element which limits the movement of the release member.

18. A hand truck comprising:
a frame;
at least one wheel which is mounted to the frame at a lower part of the frame;
at least one holding magnet for holding an object which, at least in part, has a magnetic or magnetisable outer surface; and
a release mechanism mounted to the frame, wherein the release mechanism comprises a release member movably mounted to the frame of the hand truck,
wherein the at least one holding magnet is directly attached to the release member, and
wherein the at least one magnet is attached to the frame of the hand truck and that the release member is movably mounted to the frame of the hand truck in a linear direction towards and away from the object, thereby pushing the object from the at least one magnet and providing a damage free release of the object.

19. A hand truck comprising:
a frame;
at least one wheel which is mounted to the frame at a lower part of the frame;
at least one holding magnet for holding an object which, at least in part, has a magnetic or magnetisable outer surface; and
a release mechanism mounted to the frame,
wherein the release mechanism comprises a release member movably mounted to the frame of the hand truck,
wherein the at least one holding magnet is directly attached to the release member, and
wherein the at least one magnet is attached to the frame of the hand truck and that the release member is pivotably mounted to the frame of the hand truck such that when a first end of the release member is pulled backwards by an operator a second, opposite end of the release member is pivoted towards the object, thereby pushing the object from the at least one magnet, the second end of the release member comprising means for substantially friction free contact between the second end of the release member and the surface of the object, thereby providing a damage free release of the object.

\* \* \* \* \*